(12) United States Patent
Hansen

(10) Patent No.: US 8,888,454 B2
(45) Date of Patent: Nov. 18, 2014

(54) WIND TURBINE BLADE WITH A LIGHTNING PROTECTION SYSTEM

(75) Inventor: Lars Bo Hansen, Agerskov (DK)

(73) Assignee: LM Glasfiber A/S, Kolding (DK)

( * ) Notice: Subject to any disclaimer, the term of this patent is extended or adjusted under 35 U.S.C. 154(b) by 585 days.

(21) Appl. No.: 13/254,495

(22) PCT Filed: Mar. 8, 2010

(86) PCT No.: PCT/EP2010/052904
§ 371 (c)(1),
(2), (4) Date: Sep. 2, 2011

(87) PCT Pub. No.: WO2010/100283
PCT Pub. Date: Sep. 10, 2010

(65) Prior Publication Data
US 2012/0003094 A1    Jan. 5, 2012

(30) Foreign Application Priority Data
Mar. 6, 2009  (EP) .................................. 09154511

(51) Int. Cl.
*F03D 11/00* (2006.01)
*B23P 15/02* (2006.01)
*F03D 1/06* (2006.01)

(52) U.S. Cl.
CPC ........... *F03D 1/0675* (2013.01); *F05C 2253/04* (2013.01); *F03D 11/0033* (2013.01); *Y02E 10/721* (2013.01); *Y02E 10/722* (2013.01); *F05B 2280/6003* (2013.01); *Y10S 415/908* (2013.01)
USPC .......... 416/39; 416/224; 416/230; 416/241 A; 415/4.3; 415/4.5; 415/908

(58) Field of Classification Search
CPC ............... F03D 1/0675; F03D 11/0033; F05B 2280/6003
USPC ............ 416/39, 224, 229 R, 230, 241 R, 232, 416/241 A, 247 R; 415/4.3, 4.5, 121.2, 908; 290/4, 55, 44
See application file for complete search history.

(56) References Cited

U.S. PATENT DOCUMENTS 6,457,943 B1 * 10/2002 Olsen et al. .................... 416/230
6,612,810 B1 *  9/2003 Olsen et al. ...................... 416/95

(Continued)

FOREIGN PATENT DOCUMENTS

EP     1 011 182 A1   6/2000
WO     96/07825 A1    3/1996

(Continued)

*Primary Examiner* — Igor Kershteyn
(74) *Attorney, Agent, or Firm* — Nath, Goldberg & Meyer; Jerald L. Meyer; Sanjana Mangalagiri

(57) ABSTRACT

The invention relates to a wind turbine blade with a lightning protection system, the lightning protection system comprises at least one lightning receptor arranged freely accessible in or on the shell unit surface at or in the immediate vicinity of the tip of the blade. The lightning protection system further comprises a lightning down conductor made of electrically conductive material extending within the shell body from the lightning receptor to the root end of the blade. The lightning receptor and the lightning down conductor are electrically connected. The shell body comprises at least a first conductive layer extending along at least a longitudinal part of the lightning down conductor in a transverse distance therefrom. The first conductive layer is electrically isolated from the lightning down conductor and from the lightning receptor, and has a sheet resistance in the range 1-5 Mega Ohm per square.

16 Claims, 7 Drawing Sheets

(56) References Cited

U.S. PATENT DOCUMENTS

| | | | |
|---|---|---|---|
| 7,040,864 B2 * | 5/2006 | Johansen et al. | 416/146 R |
| 7,186,086 B2 * | 3/2007 | Yoshida | 416/146 R |
| 7,988,415 B2 * | 8/2011 | Hardison et al. | 416/61 |
| 8,137,074 B2 * | 3/2012 | Mendez Hernandez et al. | 416/230 |
| 8,428,878 B2 * | 4/2013 | Naka et al. | 702/4 |
| 8,517,681 B2 * | 8/2013 | Naka et al. | 416/1 |

2008/0095624 A1    4/2008    Lewke et al.

FOREIGN PATENT DOCUMENTS

| | | |
|---|---|---|
| WO | 00/14405 A1 | 3/2000 |
| WO | 01/77527 A1 | 10/2001 |
| WO | 2007/062659 A1 | 6/2007 |
| WO | 2008/006377 A1 | 1/2008 |

* cited by examiner

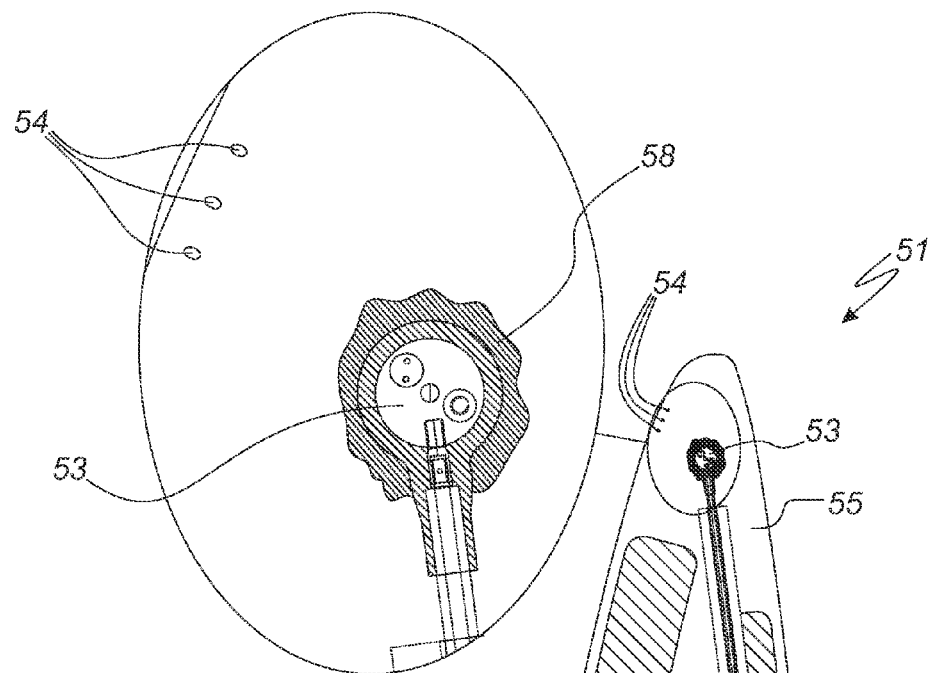
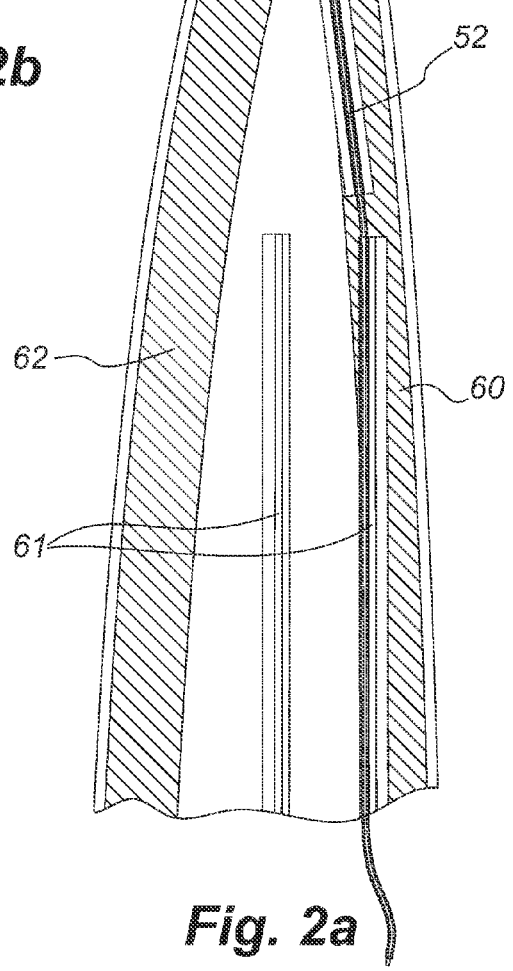
Fig. 2b
Fig. 2a

WIND TURBINE BLADE WITH A LIGHTNING PROTECTION SYSTEM

This is a National Phase Application filed under 35 U.S.C. 371 as a national stage of PCT/EP2010/052904, filed 8 Mar. 2010, and claiming the benefit from European Application No. 09154511.1, filed Mar. 6, 2009, the content of which is hereby incorporated by reference in its entirety.

TECHNICAL FIELD

The present invention relates to a wind turbine blade with a lightning protection system, wherein the blade comprises a shell body made of a composite material and comprises a longitudinal direction with a root end and a tip end. The blade further comprises a profiled contour including a pressure side and a suction side, as well as a leading edge and a trailing edge with a chord having a chord length extending there between, the profiled contour, when being impacted by an incident airflow, generating a lift. The lightning protection system comprises at least one lightning receptor arranged freely accessible in or on a surface of the shell body. The lightning protection system further comprises a lightning down conductor made of or comprising an electrically conductive material and extending within the shell body from the lightning receptor to the root end of the blade. The lightning receptor and the lightning down conductor are electrically connected.

BACKGROUND ART

It is known to provide blades with lightning protection systems to protect them from lightning strikes. As an example, WO 96/07825 discloses a lightning protection system, in which the tip of the blade is provided with a so-called lightning receptor made of an electrically conductive material. This lightning receptor can "capture" a lightning strike and conduct the current through a lightning down conductor, said conductor extending in the longitudinal direction of the blade and being earthed via the rotor hub of the wind turbine. This system has often been shown to provide a satisfactory protection against lightning strikes.

However, there is a risk of a flashover or sparkover from the lightning receptor or lightning down conductor to areas in the blade, where water has accumulated, since polluted water is electrically conductive. In this case, lightning current heats up the water, which may cause a "steam explosion". This may result in pressure increases, which are sufficiently high to damage the blade. Flashovers may also occur because of deposits of, for example, particles from the air, salts or insects on the surface of the blades. The damages due to flashovers result in the blade having to be repaired or, in the worst case, exchanged, which is a time-consuming and expensive process, since it is complicated to repair or exchange blades, especially for offshore wind power plants.

Furthermore, there is a risk of striking the lightning down conductor (or flashovers) through the surface of the blade, which at best creates only a small hole through the surface of the blade, but often causes greater damage to the blade. For a better control of the lightning current through the blade without damage thereof, the lightning protection system may be provided with several lightning receptors (multi-receptors) or lightning down conductors along the longitudinal direction of the blade. Preferably, the lightning receptors are arranged at a maximum interval of five meters to ensure that there are no lightning strikes (or flashovers) through the surface of the blade. However, this is a comparatively expensive and complicated solution.

WO 2007/062659 provides a solution in which an inner lightning conductor is electrically insulated in its entire longitudinal extent.

US 2008/062659 discloses a rotor blade with a lightning protection system comprising an insulated down conductor, where a dielectric sheet is used as insulation.

WO 00/14405 discloses a wind turbine blade, wherein the blade comprises a blade wall including oblong strips containing carbon fibre-reinforced plastics, which are electrically connected to an inner lightning down conductor.

EP 1 011 182 discloses a wind turbine blade provided with an electrically conductive tape layer on the outer surface.

WO 01/77527 discloses a wind turbine blade comprising a lightning protection system comprising one or more internal conducting means and one or more external lightning conducting means.

WO 2008/006377 discloses a wind turbine comprising a nacelle and at least one wind turbine blade, wherein at least one of said parts comprises a conductive film layer with connection to a ground potential.

BRIEF DESCRIPTION OF THE INVENTION

It is an object of the invention to obtain a new wind turbine blade, which overcomes or ameliorates at least one of the disadvantages of the prior art or which provides a useful alternative.

According to the invention, this object is achieved by the shell body comprising at least a first conductive layer extending along at least a longitudinal part of the lightning down conductor in a transverse distance therefrom, wherein the first conductive layer is electrically isolated from the lightning down conductor and/or the lightning receptor, and wherein the first conductive layer has a sheet resistance in the range of 1-5 Mega Ohm pr. square. The arrangement of the lightning receptor, lightning down conductor, and conductive layer helps to prevent the build-up of streamers and/or leaders. Providing the blade with the conductive layer lowers the electrical field around the lightning down conductor and lightning receptor during a lightning strike by acting as a parasitic conductor. This minimizes the problem with vertical streamers, which is especially present in connection with positive lightning strikes, which account for about 10% of the strikes. Such streamers and leaders are pre-stages of lightning strikes and thus, preventing their build-up also prevents lightning strikes. Moreover, the necessity of multi-receptors is avoided. If the sheet resistance of the conductive layer is too small, the conductive layer may act as a lightning receptor and increasing the risk of a flashover, potentially damaging the insulation of the lightning down conductor and the wind turbine blade. On the other hand, if the sheet resistance is too large, the influence of the layer on the electric field around the lightning down conductor is insufficient to provide the needed protection. Tests on existing blades with simulated lightning strikes at high negative voltages, corresponding to positive lightning strikes, showed that blades equipped with the new lightning protection system have showed no damages to the blade, thereby fulfilling the requirements in the IEC61400-24 CDV standard. Thus, it was surprisingly found that the addition of the first conductive layers having a relative low conductivity provides a much improved, efficient protection against positive lightning strikes compared to conventional lightning protection systems.

At its root end, the lightning down conductor is preferably connected to earth via the rotor hub so that current from a lightning strike is safely conducted from the lightning receptor to the lightning down conductor and finally to earth. However, it may be sufficient with a spark gap between the lightning down conductor and the rotor hub.

Advantageously, the lightning receptor is arranged freely accessible at or in the immediate vicinity of the tip of the blade.

According to one embodiment, the first conductive layer has a sheet resistance in the range of 1.5-4.5 Mega Ohm pr. Square, or in the range of 2-4 Mega Ohm pr. Square.

In an advantageous embodiment, the profiled contour of the blade is divided into a root region having a substantially circular or elliptical profile closest to the rotor hub, an airfoil region having a lift-generating profile furthest away from the rotor hub, and a transition region between the root region and the airfoil region. The transition region has a profile which gradually changes in the radial direction from the circular or elliptical profile of the root region to the lift-generating profile of the airfoil region.

According to a particular embodiment of the invention, the lightning down conductor and/or lightning receptor are electrically insulated at least up to the shell body of the blade and preferably at least partially through the shell body. Thus, the risk for damaging lightning strikes or flashovers at the tip end of the blade is minimised even further.

According to an advantageous embodiment of the lightning protection system according to the invention, the lightning down conductor comprises an inner conductor made of electrically conductive material, such as copper or aluminium, and a bedding insulation made of polyethylene, advantageously HDPE. Surprisingly, this composition has been found to be particularly resistant to lightning strikes or flashovers through the surface of the blade.

Advantageously, the inner conductor has a diameter in the range of 3-30 mm, 5-15 mm or 7.5-12 mm and the bedding insulation has a thickness of 2-15 mm, 3-10 mm or 4-7 mm. It has been found that these dimensions are sufficient to prevent lightning strikes through the surface of the blade as well as to conduct the current of a lightning strike through the lightning down conductor.

According to a suitable embodiment, a layer of semiconductive material is provided between the inner conductor and the bedding insulation. Advantageously, this semiconductive material has a thickness of 0.5-1 mm. The semiconductive material provides additional protection against flashovers by minimising electrical field concentrations in the conductor.

According to a particular embodiment, the lightning receptor and the connection area between the lightning receptor and the lightning down conductor are insulated by means of an insulating material, which is separate from the bedding material. This insulating material may e.g. be a shrink sleeve or silicone. The additional insulating material minimizes the risk of a lightning strike or flashover in the connection area between the lightning receptor and the lightning down conductor.

According to an alternative embodiment of the invention, the tip of the blade is formed as a substantially solid body of insulating material. Advantageously, this insulating material is a plastic material, such as PVC, fibre-reinforced polymer or polyurethane (PUR), e.g. foam PUR. This provides a particularly simple embodiment, where the risk of lightning strikes in the connection area between the lightning receptor and the lightning down conductor is minimised.

According to a suitable embodiment of the invention, the lightning down conductor is provided with a connection means, e.g. a thread, at its outer end to connect said conductor to a corresponding means on the lightning receptor. The lightning receptor may e.g. be adapted to include an inner thread so that the lightning receptor and the lightning down conductor can be screwed together. According to another suitable embodiment, the lightning receptor is provided with a connection piece having an outer thread, while the lightning down conductor includes an inner thread, e.g. cut into the insulating sheathing made of HDPE.

According to an embodiment of the invention, the lightning receptor is positioned at the trailing edge of the blade. Thus, noise emissions from the blade may be reduced. It may be advantageous to provide the surface of the blade with a diverter so that lightning striking at the leading edge of the blade is conducted to the lightning receptor.

According to a particularly suitable embodiment, additionally at least one drain hole is arranged at or in the immediate vicinity of the tip of the blade, and optionally, a diverter extending substantially between the location of the drain hole and the location of the lightning receptor is positioned on the surface of the blade. The drain hole ensures that accumulations of water do not form within the blade, which increases the risk of flashovers from the lightning down conductor to said accumulations of water. The diverter ensures that a lightning striking a drain hole is conducted to the lightning receptor via the diverter and finally to earth via the lightning down conductor. Additionally, a filter for the collection of particles is advantageously arranged inside the blade so that said particles do not block the drain hole.

According to an advantageous embodiment, the lightning receptor has the form of a Franklin rod or is substantially shaped like an egg. This form ensures that the lightning receptor has no "sharp" edges to be struck by lightning and to be damaged e.g. by melting. A rounded receptor surface prolongs the useful life of the receptor, since its geometry is altered only minimally by a lightning strike.

According to an alternative embodiment of the invention, a part of the tip of the blade is adapted to be the lightning receptor made of e.g. tungsten, copper or brass. This provides a particularly simple embodiment of the tip of the blade. Advantageously, the lightning receptor is streamlined so that it matches the tip of the blade.

According to another embodiment of the invention, the first conductive layer comprises a conductive coating. A conductive coating provides for a simple manufacturing process, as the coating may be applied to the blade by conventional coating procedures. A conductive paint may e.g. be painted on the blade with a paint roll.

According to another embodiment of the invention, the first conductive layer comprises a conductive net. The net must be adapted to have a resistance equivalent to the abovementioned sheet resistance, and may be embedded in the shell body during fabrication.

According to another embodiment of the invention, the first conductive layer is located on an outer surface of the shell body. Thus, the layer may be added to existing blade designs with a minimum of change in manufacturing and blade performance. Furthermore, this embodiment may be used for blades that are not made as separate shell body half parts and subsequently joined.

According to another embodiment of the invention, the first conductive layer is located on an inner surface of the shell body. Formation of the conductive layer on the inside of the shell body ensures that the outside of the blade may be optimized with regards to its aerodynamic properties, regardless of the properties of the conductive layer. An additional advantage of this placement of the conductive layer is that a wider choice of layer materials are available, since the requirements for environmental stability, e.g. with regards to water resistance, may be less strict.

According to a specific embodiment, the layer may be applied after two half parts of the shell body have been moulded, but before they are glued together to form the blade. In this case, only minor changes may be needed in an existing production method.

According to another embodiment of the invention, the first conductive layer is incorporated inside the shell body material. In this way, the conductive layer may be incorporated inside the shell body material during lay-up of the composite material. This leaves both the inside and outside of the shell body unchanged, so that surface finishing steps of production may be conducted as usual. Furthermore, the conductive layer may be adapted to provide structural strength to the blade, e.g. if provided as a net.

In a particular embodiment, the conductive layer is applied to the mould as a coating just after a gelcoat layer has been applied, but before, e.g. the glass fibre mats are laid up.

According to another embodiment of the invention, the first conductive layer may be a strip having a longitudinal direction oriented substantially along the longitudinal direction of the blade.

The wind turbine blade may also comprise a second conductive layer with a sheet resistance in the same interval as that of the first conductive layer.

According to another embodiment of the invention, the first conductive layer is located at or in proximity to the leading edge, and a second conductive layer is located at or in proximity to the trailing edge. This provides an effective suppression of vertical streamers for the blade in any position of rotation.

The conductive layer(s) may be provided on the suction side and/or the pressure side of the blade.

The objective of the invention is also achieved by a wind turbine having a rotor, wherein the rotor comprises a number of blades, preferably two or three, according to the above-mentioned embodiments. By providing the wind turbine with blades according to the invention, a particularly effective lightning protection system is provided that protects the wind turbine from all kind of lightning.

Furthermore, the objective of the invention is achieved by a method for retrofitting a lightning protection system to a wind turbine blade, wherein the blade comprises a shell body made of a composite material and comprises a longitudinal direction with a root end and a tip end, the blade further comprising a profiled contour including a pressure side and a suction side, as well as a leading edge and a trailing edge with a chord having a chord length extending there between, the profiled contour, when being impacted by an incident airflow, generating a lift, the method comprising the steps of:

providing the blade with at least a first lightning receptor arranged freely accessible in or on a surface of the shell body surface, and optionally at or in the immediate vicinity of the tip end of the blade, providing the blade with a lightning down conductor made of electrically conductive material extending within the shell body from the lightning receptor to the root end of the blade, the lightning receptor and the lightning down conductor being electrically connected, and providing the shell body with at least a first conductive layer extending along at least a longitudinal part of the lightning down conductor in a transverse distance therefrom, wherein the first conductive layer is electrically isolated from the lightning down conductor and/or the lightning receptor, and wherein the sheet resistance of the conductive layer is in the range 1-5 Mega Ohm pr. square. According to this inventive method, an existing wind turbine blade may be protected from flashovers and streamer/leader build-up.

The first conductive layer may of course be retrofitted to existing wind turbine blades with a lightning protection system, e.g. by painting the first conductive layer on the outer surface of the blade.

The novel lightning protection system may also be applied to wind turbine blades having an outer down conductor, i.e. where the down conductor is arranged on or at the outer surface of the blade, e.g. by arranging the down conductor at the leading edge and/or the trailing edge of the blade. Accordingly, the first conductive layer may extend substantially parallel to the down conductor(s) in a transverse distance from the down conductor, e.g. by applying the conductive layer to the pressure side and/or the suction side of the blade.

BRIEF DESCRIPTION OF THE DRAWING

The invention is explained in greater detail below by way of embodiments which are shown in the drawings, in which FIG. 2a is a schematic top view of a blade according to a second embodiment of the invention, FIG. 2b shows a magnified detail of the blade shown in FIG. 2a, FIG. 3a is a schematic sectional view along the line IIb-IIb in FIG. 3b of a part of a blade according to another embodiment of the invention.

DETAILED DESCRIPTION

Figure 6:
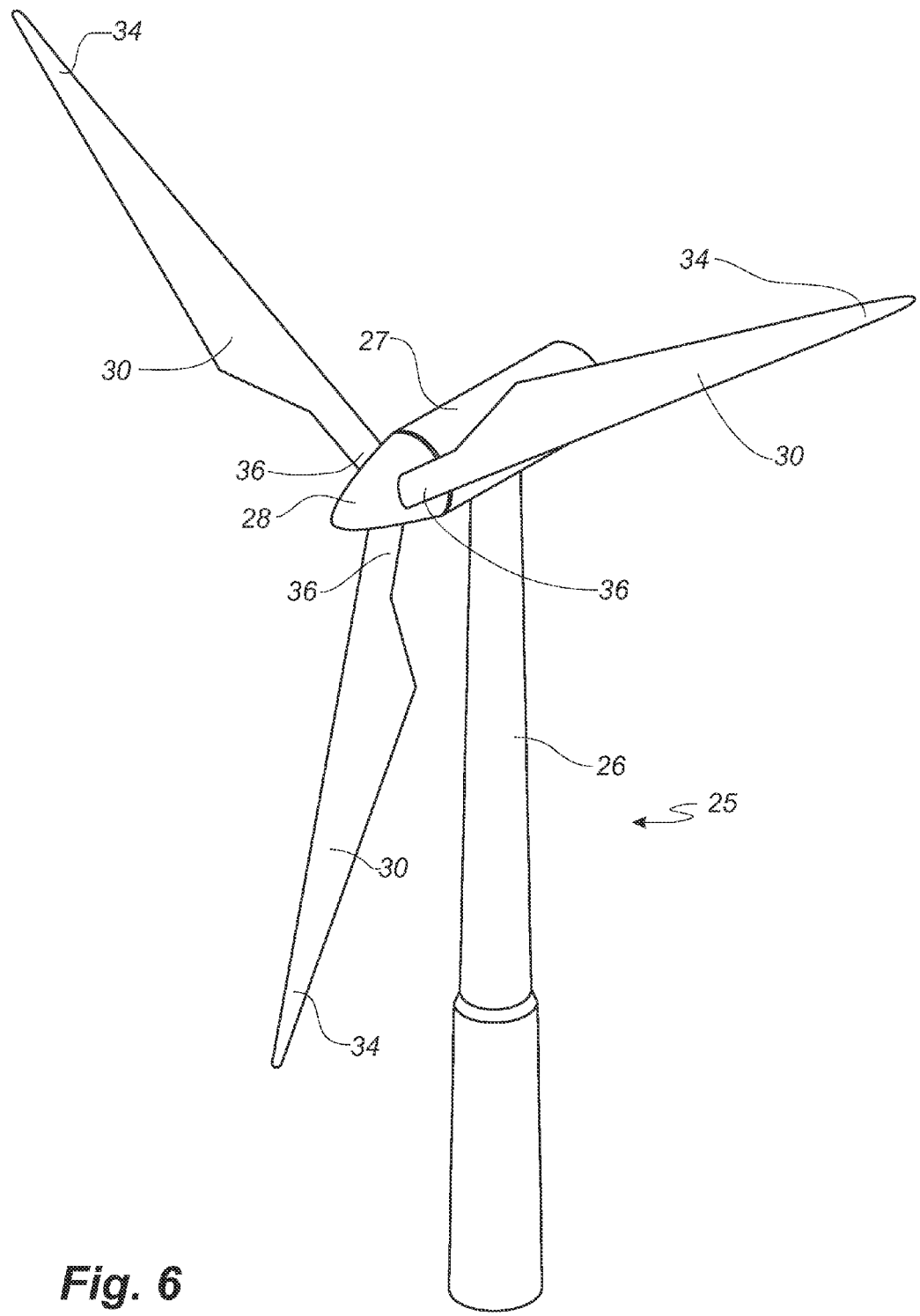
FIG. 6 shows a wind turbine.

FIG. 6 illustrates a conventional modern upwind wind turbine 25 according to the so-called "Danish concept" with a tower 26, a nacelle 27 and a rotor with a substantially horizontal rotor shaft. The rotor includes a rotor hub 28 and three blades 30 extending radially from the hub 28, each having a blade root 36 nearest the hub and a blade tip 34 furthest from the hub 28.

Existing lightning protection systems for blades on a wind turbine according to the Danish concept often use a construction where a so-called lightning receptor made of electrically conductive material is provided at the tip of the blade. This lightning receptor can "capture" a lightning strike and conduct the current through a lightning down conductor, said conductor extending in the longitudinal direction of the blade and being earthed via the rotor hub. Typically, the receptor is connected with one side of an anchoring block, while the lightning down conductor is connected with the other side of the same anchoring block. It has been found that this construction provides effective protection against lightning strikes, however, it has also been found that it is vulnerable to lightning strikes through the surface of the blade—especially in situations where lightning strikes occur while the blade is in an approximately horizontal position during the rotation of the rotor. Moreover, the anchoring block is often rectangular and has sharp edges, which increases the probability of streamer built-up at said sharp edges and thus the probability of a lightning strike or flashover.

For a better control of the lightning current through the blade without damage thereof, the lightning protection system of the blade may be provided with several lightning receptors or lightning down conductors along the longitudinal direction of the blade. Preferably, the lightning receptors are arranged at a maximum interval of five meters to ensure that there are no lightning strikes through the surface of the blade. However, this is a comparatively expensive and complicated solution.

Figure 7:
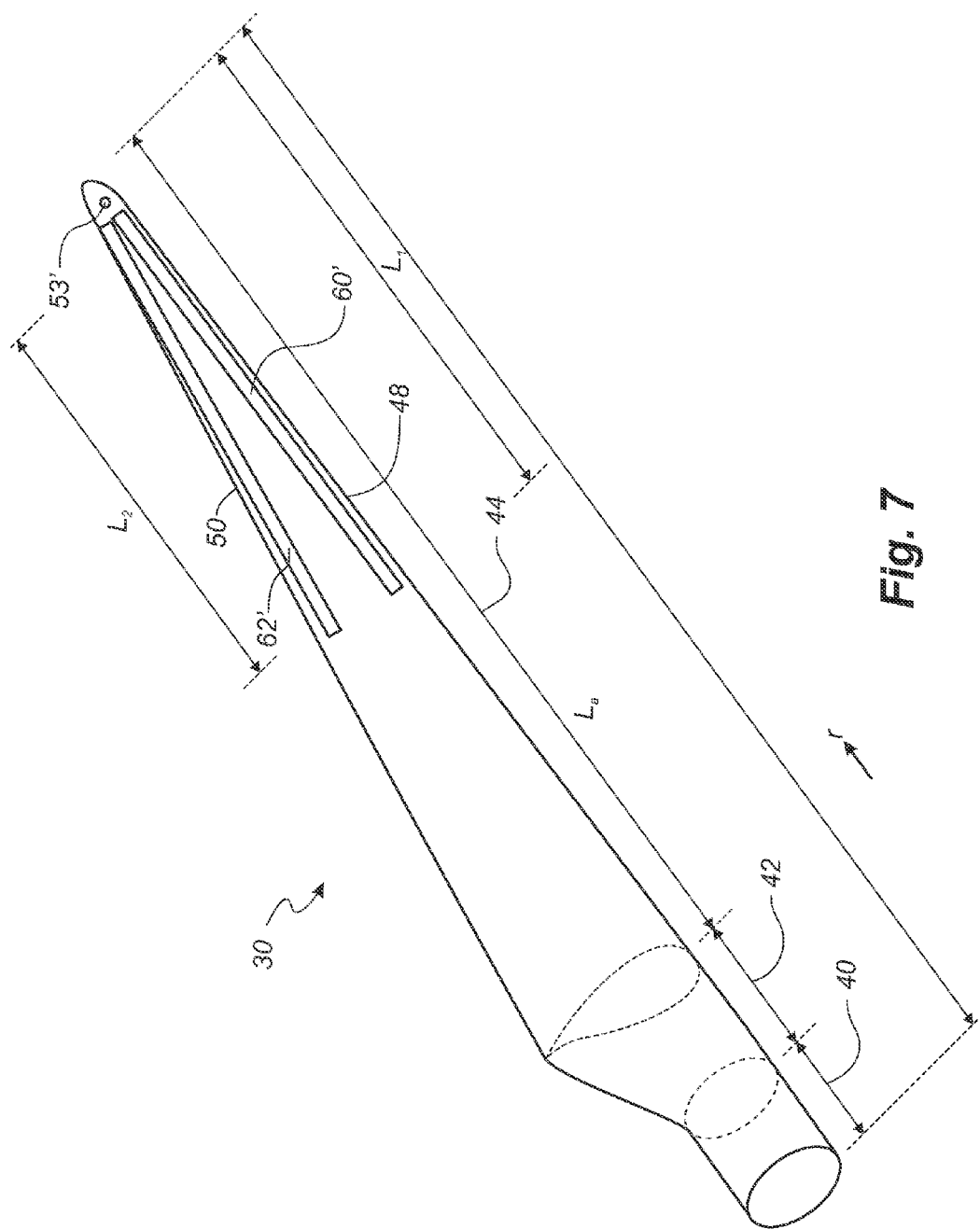
FIG. 7 shows a schematic view of yet another embodiment of a wind turbine blade according to the invention.

FIG. 7 shows a schematic view of an embodiment of a wind turbine blade 30 according to the invention. The wind turbine blade 30 has the shape of a conventional wind turbine blade and comprises a root region 40 closest to the rotor hub, a profiled or an airfoil region 44 furthest away from the hub and a transition region 42 between the root region 40 and the airfoil region 44. The blade 30 comprises a leading edge 48 facing the direction of rotation of the blade 30, when the blade is mounted on the hub, and a trailing edge 50 facing the opposite direction of the leading edge 48.

The airfoil region 44 (also called the profiled region) has an ideal or almost ideal blade shape with respect to generating lift, whereas the root region 40 due to structural considerations has a substantially circular or elliptical cross-section, which for instance makes it easier and safer to mount the blade 30 to the rotor hub. The diameter (or the chord) of the root region 40 is typically constant along the entire root area 40. The transition region 42 has a transitional profile gradually changing from the circular or elliptical shape of the root region 40 to the airfoil profile of the airfoil region 44. The width of the transition region 42 typically increases substantially linearly with increasing distance r from the rotor hub.

The airfoil region 44 has an airfoil profile with a chord extending between the leading edge 48 and the trailing edge 50 of the blade 30. The width of the chord decreases with increasing distance r from the rotor hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the rotor hub.

The blade 30 is provided with a lightning receptor 53' at the tip end of the blade, the lightning receptor being electrically connected to an inner down conductor (not shown). A first conductive layer 60' is provided at the leading edge of the blade 48 and extends in a first strip along a longitudinal part of the blade 30 and thus along the inner down conductor. A second conductive layer 62' is provided at the trailing edge of the blade 50 and also extends in a second strip along a longitudinal part of the blade 30 and thus also along the inner down conductor. The first conductive layer 60' and the second conductive layer 62' have a sheet resistance in the range of 1 to 5 Mega Ohm per square.

The first conductive layer 60' has a first longitudinal extent $L_1$, whereas the second conductive layer 62' has a second longitudinal extent $L_2$. The wind turbine blade 30 has a total length L, and the airfoil region 44 has a longitudinal extent $L_a$. In the depicted embodiment, the conductive layers 60', 62' only extend along a part of the airfoil region 44. However, in an advantageous embodiment, the conductive layers 60', 62' extend along substantially the entire airfoil region 44. The conductive layers may also extend into the transition region 42 and/or the root region 40. The conductive layers may also be provided with gaps in the longitudinal direction, i.e. a plurality of conductive layers positioned in different longitudinal parts of the blade. In one advantageous embodiment, the first longitudinal extent $L_1$ of first conductive layer 60' and/or the second longitudinal extent $L_2$ of the second conductive layer 62' are at least 20%, or at least 30%, or at least 40%, or at least 50% of the longitudinal extent $L_a$ of the airfoil region 44. In another advantageous embodiment, the first longitudinal extent $L_1$ of first conductive layer 60' and/or the second longitudinal extent $L_2$ of the second conductive layer 62' are at least along at least 20%, or at least 30%, or at least 40%, or at least 50% of the longitudinal extent L of the wind turbine blade 30.

Figures 1A, 1B, 1C:
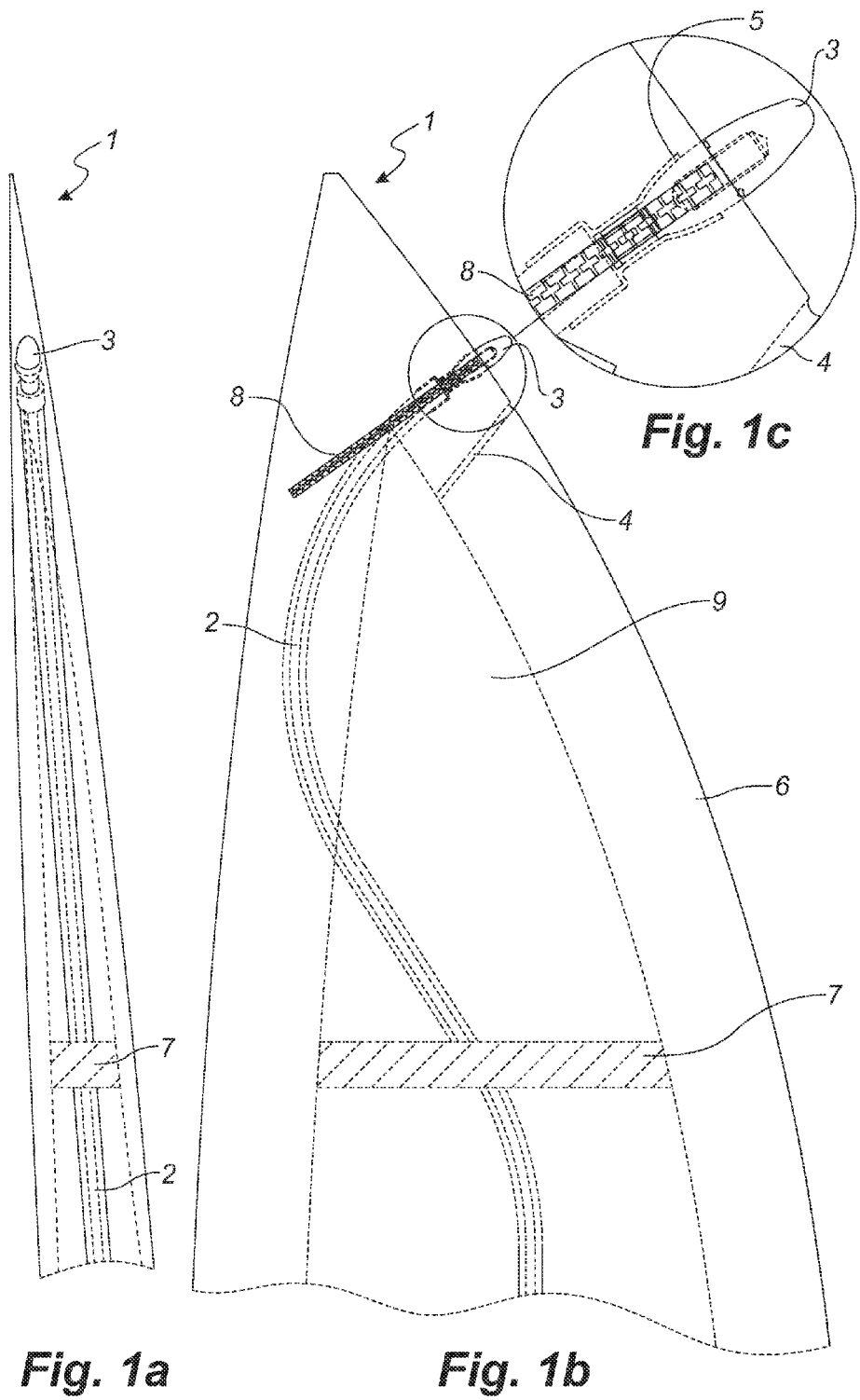
FIG. 1a is a schematic view of a blade according to a first embodiment of the invention, seen towards the trailing edge of the blade.
FIG. 1b is a top view of the same blade.
FIG. 1c shows a magnified detail of the blade shown in FIG. 1b.

FIG. 1a-c shows the tip area of one embodiment of a blade 1 according to the invention. According to this embodiment, a lightning receptor 3 is positioned at the tip end of the blade 1, said lightning receptor preferably, but not necessarily, being predominantly egg-shaped or formed like a so-called Franklin rod. The lightning receptor 3 is connected to a lightning down conductor 2 extending substantially in the entire longitudinal direction of the blade 1 from the lightning receptor 3 at the tip of the blade 1 to the root area of the blade 1 at the rotor hub. A conductive layer (not shown) extends along a part of the length of and in a transverse distance from the lightning down conductor similar to the embodiment shown in FIG. 7. Preferably, the lightning down conductor portion is electrically connected to the rotor hub, and lightning current from lightning striking the lightning receptor 3 can thus be led to earth via the lightning down conductor 2 and the hub, said hub being earthed via a second lightning down conductor (not shown) connected to an earth rod by means of e.g. the tower and the nacelle. Furthermore, one or more spark gaps may be provided between the lightning down conductor 2 and the hub or between the lightning down conductor 2 and the tower. The lightning down conductors and the earth rod may be copper conductors or may be made of any other electrically conductive material.

The lightning down conductor 2 is insulated substantially in its entire longitudinal direction from the root area of the blade 1 to the connection area between the lightning down conductor 2 and the lightning receptor 3. The blade 1 is made up of a shell body preferably made of fibre-reinforced polymer so that the blade 1 comprises a laminate shell 6 and a cavity 9 inside the blade 1, respectively. The lightning down conductor 2 and the lightning receptor 3 are connected e.g. by means of a screw thread, where the lightning receptor 3 is preferably provided with an inner thread. However, it is also conceivable to provide an embodiment, where the receptor 3 is provided with a connection piece having an outer thread, said connection piece being screwed together with an inner thread of the lightning down conductor 2.

The lightning receptor 3 is positioned in the laminate shell 6 of the blade 1 in such a way that a portion of the receptor 3 projects from the surface of the blade 1 at its trailing edge, where the lightning down conductor 2 is passed through a portion of the laminate shell 6. The lightning down conductor 2 shown herein includes a first insulation in the form of a bedding or covering insulation. Additionally, the connection area between the receptor 3 and the lightning down conductor 2 is electrically insulated by means of a further insulation 5 in the form of a shrink sleeve. The shrink sleeve 5 extends a short distance into the bedding insulation of the lightning down conductor 2 and a short distance into the receptor 3. Thus, the lightning down conductor 2 is completely insulated up to the receptor 3.

Furthermore, the blade 1 is provided with a drain hole 4 which also passes through the laminate 6 and which is positioned at the trailing edge of the blade 1. The drain hole 4 is connected to the cavity 9, the latter thus communicating with the environment. In this way, the accumulation of water inside the blade 1 is avoided at all times, since water is emptied from the blade 1 via the drain hole 4 by centrifugal forces during the rotation of the rotor. Simultaneously, the blade 1 may be provided with a filter 7 to collect dust and other dirt, which may be present inside the blade 1 so that these are not thrown towards the drain hole 4 and block it. Preferably, the filter 7 is positioned across the entire cross-section of the cavity 9. By positioning the receptor 3 and the drain hole 4 at the trailing edge of the blade 1, noise arising from the rotation of the rotor is reduced.

Additionally, the surface of the blade 1 may be provided with a diverter 8 extending from an area adjacent the receptor 3 at the trailing edge of the blade 1 to an area at the leading edge of the blade 1. This diverter ensures that lightning striking the leading edge of the blade 1, while the blade 1 is in a substantially horizontal position, where the receptor 3 faces downwards, is conducted to the receptor 3 and via the latter to the lightning receptor 2. The diverter 8 may be a continuous strip of electrically conductive material, but may also be segmented, where leaders of ionized air are formed between the individual segments upon a lightning strike, the lightning current thereby being conducted along the diverter 8 in its longitudinal direction.

As shown in FIG. 1c, the receptor 3 may be divided into two so that one portion of the receptor is moulded into the laminate shell 6 of the blade 1, while the second portion is attached to the first portion by means e.g. a threaded connection. Thus, it is easy to exchange the portion of the receptor 3 projecting from the surface of the blade 1, if said portion is worn or damaged after a lightning strike.

FIG. 2 shows another embodiment of a blade 51 according to the invention. The blade 51 comprises a lightning down conductor 52, which extends in substantially the full longitudinal length of the blade 51 from the root end to the tip end. The lightning down conductor 52 may be routed along a supporting beam 61 within the blade, at least along part of length of the blade. Near the tip, the blade 51 is provided with three drain holes 54, which are communicatively connected to the inner cavity of the blade. In the tip end, the lightning down conductor 52 is connected with lightning receptor 53. The lightning receptor is fixed in the blade with glue 58. A first conductive layer 60 is arranged at the leading edge of the blade, and a second conductive layer 62 is arranged at the trailing edge of the blade. The conductive layers may be formed on both the trailing and leading edge, and on both the upwind and downwind side of the blade, i.e. the pressure side and the suction side of the blade. Thus, the blade may also be provided with a third and a fourth conductive layer. However, a single conductive layer may be sufficient according to the invention. In one example, the conductive layers made by painting a layer of APC8116D anti-static coating by Crosslink with a short-haired paint roll on top of the gelcoat on the outside of a blade. The conductive coating may alternatively be applied to the inside of the gelcoat, while the shell body is being built. In this way, the conductive coating is sandwiched between the gelcoat and the composite material. The sheet resistance of the conductive layers is in the range 1-5 Mega Ohm per square, which have shown to provide an efficient protection against positive lightning strikes. Thus, the conductive layers have a relatively low conductivity, thus ensuring that the conductive layers do not act as lightning receptor, however, providing a high enough conductivity to act as a parasitic conductor.

Figure 3A:
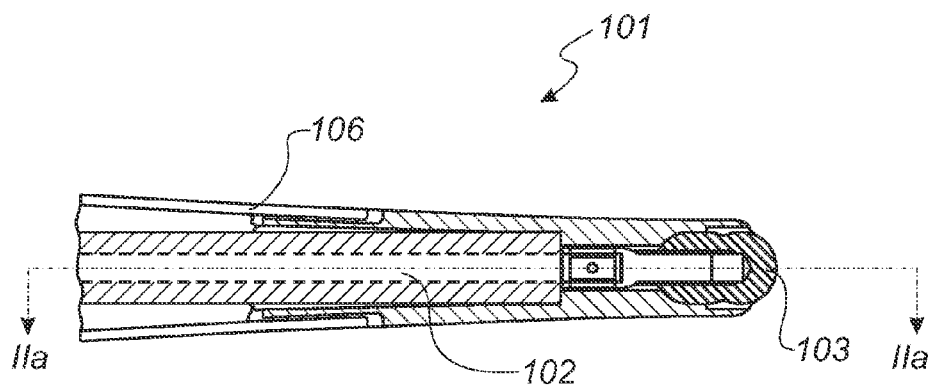
FIG. 3b is a partially sectional view of the same blade along the line IIa-IIa in FIG. 3a, FIG. 4 is a schematic partially sectional top view of a part of a blade according to a another embodiment of the invention.
Figure 3B:
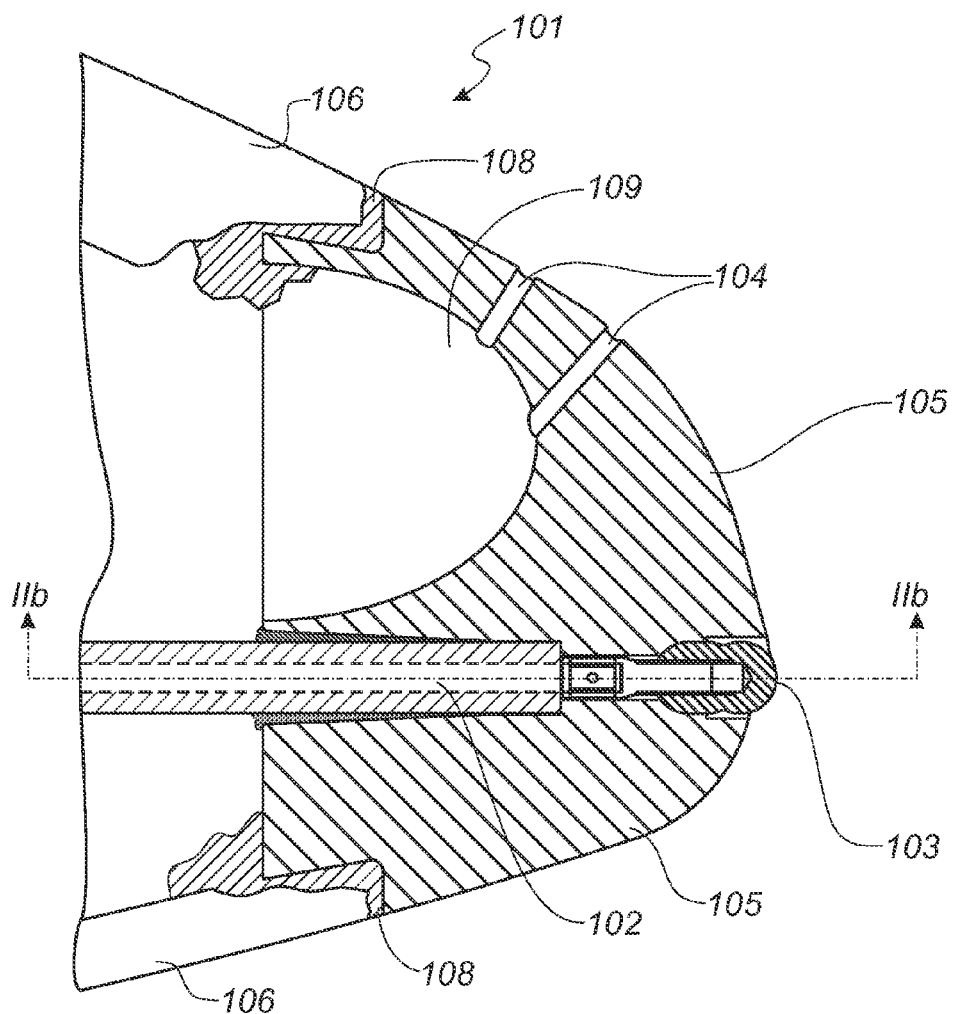

FIG. 3 shows a third embodiment of a blade 101 according to the invention. The blade 101 according to this embodiment has a tip 105 formed as a solid body of e.g. polyurethane, PVC or fibre-reinforced polymer. The rest of the blade 101 is made of a shell body having a laminate shell 106. As in the embodiment shown in FIG. 1 and FIG. 2, the lightning protection system of the blade includes a lightning down conductor 102 extending substantially in the entire longitudinal direction of the blade 101 from the root end at the rotor hub and to the tip end as well as one or more conductive layers in or on the shell body (not shown) and extending along a part of the length of and in a transverse distance from the lightning down conductor 102. The lightning down conductor 102 is guided out of the cavity of the blade 101 and into a hole created in the tip 105 and matching the lightning down conductor 102. The lightning down conductor may be glued to this hole. The lightning down conductor is connected with a substantially egg-shaped lightning receptor 103. The lightning receptor 103 is positioned at the surface of the tip 105 so that a small portion thereof projects from the surface. The position and the form of the receptor 103 are adapted to match the desired aerodynamic properties of the tip 105 of the blade 101, while simultaneously having a large metal surface, which ensures good durability and long life, since it contains a large amount of material, which may melt upon a lightning strike.

As in the embodiment shown in FIG. 1 and FIG. 2, the lightning down conductor 102 and the receptor 103 are preferably connected by means of a threaded connection, where the connection area between the lightning down conductor 102 and the receptor 103 may be electrically insulated by means of an additional insulation in the form of e.g. a shrink sleeve or silicone. However, the solid tip 105 may be sufficient to provide the desired electrical insulation.

The tip 105 is provided with a cavity 109 being connected to two drain holes 104 so that the cavity can communicate with the environment via the holes. When the rotor rotates, water having possibly accumulated inside the blade 101 is thus guided to the cavity 109 of the tip 105 and from there out through the drain holes 104 due to centrifugal forces. Preferably, the tip 105 is additionally provided with a diverter extending between an area adjacent the drain holes 104 and an area adjacent the receptor 103 on the surface of the tip 105. Any lightning striking the drain holes 104 is thus conducted via the diverter to the receptor 103 and via the latter to the lightning down conductor 102 and finally to earth via the rotor hub, the tower or the like. The tip 105 is fastened to the rest of the blade 101 by means of a glue joint 108.

Figure 4:
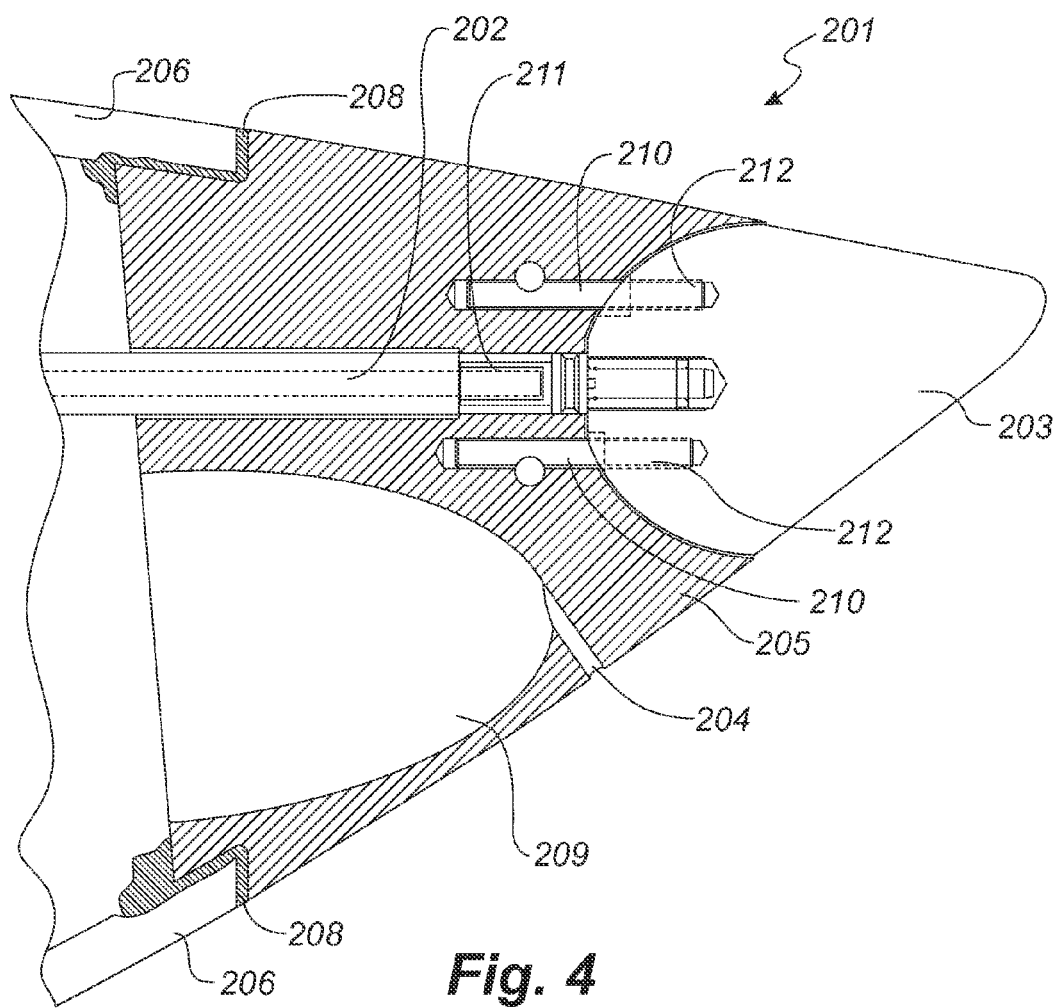

FIG. 4 shows a fourth embodiment of a blade 201 according to the invention. The blade 201 according to this embodiment has a tip 205 formed as a substantially solid body of e.g. polyurethane, PVC or fibre-reinforced polymer as in the embodiment shown in FIG. 3. The rest of the blade 201 is made of a shell body having a laminate shell 206. As in the embodiments shown in FIG. 1, FIG. 2, and FIG. 3, the lightning protection system of the blade 201 includes a lightning down conductor 202 extending substantially in the entire longitudinal direction of the blade 201 from the root end at the rotor hub and to the tip end as well as one or more conductive layers in or on the shell body (not shown) and extending along a part of the length of and in a transverse distance from the lightning down conductor 202. The lightning down conductor 202 is guided out of the cavity of the blade 201 and into a hole created in the tip 205 and fitting the shape of the lightning down conductor 202.

The lightning down conductor 202 is connected to a lightning receptor 203 having a rounded shape and positioned at the apex of the tip 205. The lightning receptor 203 is adapted so that there is a substantially smooth transition between the tip 205 and the receptor 203 and so that it has the desired aerodynamic properties of the tip 201. In other words, the receptor 203 according to this embodiment is a part of the tip of the blade 201.

As in the embodiments shown in FIG. 1, FIG. 2 and FIG. 3, the lightning down conductor 202 and the receptor 203 are connected by means of a clamped connection or a threaded connection 211. Moreover, the lightning down conductor is anchored to the tip 205 by means of two plastic rods 210 with outer thread and two threaded holes in the receptor 203. The connection area between the lightning down conductor 202 and the receptor 203 is electrically insulated by means of a further insulation in the form of e.g. a shrink material or silicone. However, the solid tip 205 may be sufficient to provide the desired electrical insulation.

Since lightning "tries" to find the shortest way to earth, lightning often strikes the blade of the rotor which at the time of striking projects the highest in the air. However, there is a risk of lightning striking a blade while being in a substantially horizontal position during the rotation of the rotor. This is the situation with the highest probability of a lightning strike through the laminate of the blade or at the joints between the blade shell halves.

The present applicant has conducted a number of tests to examine lightning protection systems for blades in such worst-case scenarios. The so-called high voltage switching and lightning impulse simulations were conducted by suspending a blade in a horizontal position above a laboratory floor or surface which during the test simulates an equipotential surface, which prior to a lightning strike occurs above the blade, while being near the horizontal position. A potential difference was built up between the laboratory surface and the lightning protection system of the blade to provoke a flashover between the lightning protection system of the blade and the laboratory floor. The tests were carried out with both positive and negative polarity, where flashovers with positive polarity were carried out at 1050 kV, while flashovers with negative polarity were carried out at 1400 kV.

The tests were carried out with various LM28.8P and LM53.2P blades from LM Glasfiber with different lightning protection systems. It was demonstrated very quickly that traditional lightning protection systems, where the receptor and the lightning down conductor are connected to an anchoring block, insufficiently prevent lightning strikes through the laminate of the blade or the joints of the blade shell halves.

When testing different lightning down conductors for a lightning protection system corresponding to the lightning protection system shown in FIG. 1 without conductive layers, it was surprisingly found that a lightning down conductor in the form of a cable having a copper core and an insulation made of high density polyethylene (HDPE) was particularly effective in preventing lightning striking through the surface of the blade. After 22 simulated lightning strikes, 12 positive ones and 10 negative ones, the blade showed no visible damage or other negative effects. During all simulated lightning strikes only streamer formation at the receptor of the blade was observed.

Subsequent tests on blades without conductive layers at higher negative voltages, corresponding to positive lightning strikes, however found that additional protection was needed.

Therefore, tests on an LM53.2P blade part equipped with the lightning protection system as shown in FIG. 2 including conductive layers were subsequently performed with three successful switching impulses with voltages of −1410 kV, −1416 kV, and −1880 kV without damage, thereby fulfilling the requirements in the IEC61400-24 CDV standard. Thus, it was surprisingly found that the addition of the conductive layers provided an efficient protection against positive lightning, even in the worst case orientation with the blade almost parallel to the ground at an angle of 5 degrees from horizontal.

Figure 5:
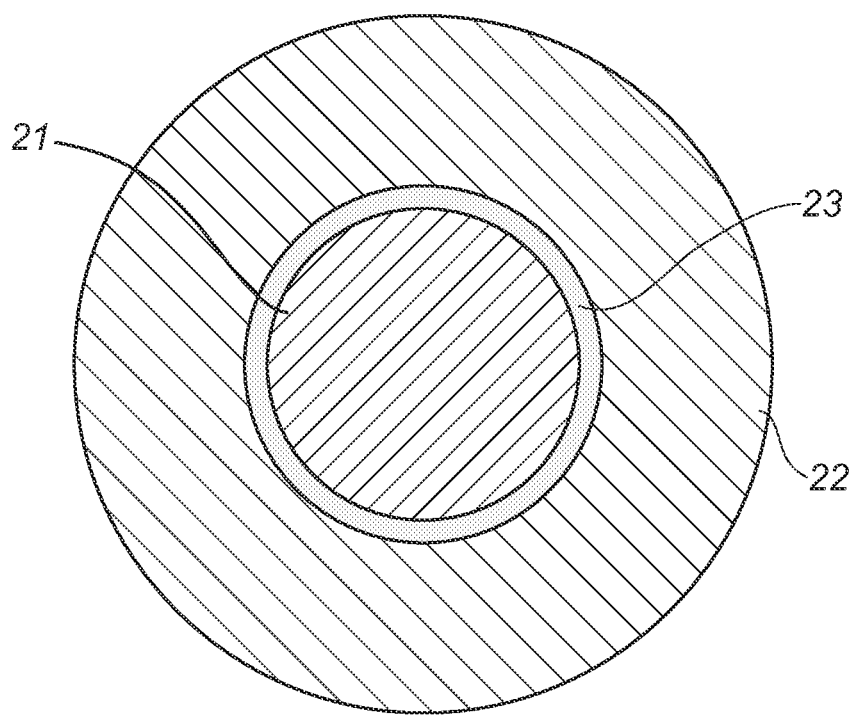
FIG. 5 is a sectional view through a lightning down conductor according to the invention.

As shown in FIG. 5, the examined cable is constructed of a 50 mm$^2$ core 21 made of copper wires and an approx. 4.5 mm thick insulation sheathing 22 made of HDPE. Between the core 21 and the insulation 22, there is provided a semiconductive material 23 having the object to minimize electrical field concentrations at the individual copper wires. However, the semiconductive material 23 is not absolutely necessary to achieve the desired effect for the lightning protection system. It was found to be sufficient to use a comparatively thin HDPE insulation. This is advantageous, since the cable does not result in an unnecessarily large increase in the blade weight. Moreover, such a cable is very inexpensive. Thus, the novel lightning protection system does not only effectively prevent lightning strikes through the surface of the blade, but also provides a simpler construction and is less expensive to manufacture than traditional lightning protection systems with or without multireceptors.

However, by using the conductive layers 60, 60', 62, 62' it may be sufficient to use down conductors without any insulation.

The invention has been described with reference to preferred embodiments. Many modifications are conceivable without thereby deviating from the scope of the invention. Modifications and variations apparent to those skilled in the art are considered to fall within the scope of the present invention.

REFERENCE NUMERAL LIST 1, 51, 101, 201 blade
2, 52, 102, 202 lightning down conductor
3, 53, 103, 203 lightning receptor
4, 54, 104, 204 drain hole
5 shrink sleeve or shrink material
105, 205 tip
6, 106, 206 laminate shell
7 filter
7 diverter
58, 108, 208 glue joint
9, 109, 209 cavity
21 inner conductor
22 insulation bedding or covering
23 semiconductive material
25 wind turbine
26 tower
27 nacelle
28 rotor hub
30 blade
34 blade tip
36 blade root
40 root region
42 transition region
44 airfoil region
48 leading edge
50 trailing edge
60 first conductive layer
61 support beam 62 second conductive layer
210 plastic rod
211 threaded connection
212 threaded hole

The invention claimed is:

1. A wind turbine blade with a lightning protection system (1, 51, 101, 201), wherein the blade (1, 51, 101, 201) comprises a shell body made of a composite material and comprises a longitudinal direction with a root end and a tip end, the blade further comprising a profiled contour including a pressure side and a suction side, as well as a leading edge and a trailing edge with a chord having a chord length extending there between, the profiled contour, when being impacted by an incident airflow, generating a lift, and wherein the lightning protection system comprises:
  at least one lightning receptor (3, 53, 103, 203) arranged freely accessible in or on a surface of the shell body surface, and
  a lightning down conductor (2, 52, 102, 202) made of or comprising an electrically conductive material and extending within the shell body from the lightning receptor (3, 53, 103, 203) to the root end of the blade (1, 51, 101, 201), and wherein
  the lightning receptor (3, 53, 103, 203) and the lightning down conductor (2, 52, 102, 202) are electrically connected, characterized in that
    the shell body comprises at least a first conductive layer (60, 62) extending along at least a longitudinal part of the lightning down conductor (2, 52, 102, 202) in a transverse distance therefrom, wherein the first conductive layer (60, 62) is electrically isolated from the lightning down conductor (2, 52, 102, 202) and from the lightning receptor (3, 53, 103, 203), and wherein the first conductive layer (60, 62) has a sheet resistance in the range of 1 to 5 Mega Ohm per square.

2. A wind turbine blade (1, 51, 101, 201) according to claim 1, wherein the at least one lightning receptor (3, 53, 103, 203) is arranged at or in the immediate vicinity of the tip of the blade (1, 51, 101, 201).

3. A wind turbine blade (1, 51, 101, 201) according to claim 1, wherein the profiled contour is divided into: a root region having a substantially circular or elliptical profile closest to the rotor hub, an airfoil region having a lift-generating profile furthest away from the rotor hub, and a transition region between the root region and the airfoil region, the transition region having a profile gradually changing in the radial direction from the circular or elliptical profile of the root region to the lift-generating profile of the airfoil region.

4. A wind turbine blade (1, 51, 101, 201) according to claim 3, wherein the first conductive layer extends along at least 20%, or along at least 30%, or along at least 40%, or at least 50% of a longitudinal extent of the airfoil region.

5. A wind turbine blade (1, 51, 101, 201) according to claim 1, wherein the first conductive layer extends along at least 20%, or along at least 30%, or along at least 40%, or at least 50% of a longitudinal extent of wind turbine blade.

6. A wind turbine blade (1, 51, 101, 201) according to claim 1, wherein the lightning down conductor comprises an inner conductor (21) made of electrically conductive material selected from a group consisting of copper and aluminium, and a bedding insulation (22) selected from a group consisting of polyethylene and HDPE.

7. A wind turbine blade (1, 51, 101, 201) according to claim 1, wherein the first conductive layer comprises a conductive coating.

8. A wind turbine blade (1, 51, 101, 201) according to claim 1 wherein the first conductive layer comprises a conductive net.

9. A wind turbine blade (1, 51, 101, 201) according to claim 1, wherein the first conductive layer is located on an outer surface of the shell body.

10. A wind turbine blade (1, 51, 101, 201) according to claim 1, wherein the first conductive layer is located on an inner surface of the shell body.

11. A wind turbine blade (1, 51, 101, 201) according to claim 1, wherein the first conductive layer is imbedded in the composite material of the shell body.

12. A wind turbine blade (1, 51, 101, 201) according to claim 1, wherein the first conductive layer may be a strip having a longitudinal direction oriented substantially along the longitudinal direction of the blade.

13. A wind turbine blade (1, 51, 101, 201) according to claim 1, wherein the first conductive layer is located at or in proximity to the leading edge, and a second conductive layer is located at or in proximity to the trailing edge.

14. A wind turbine having a rotor, characterized in that the rotor comprises a number of blades (1, 51, 101, 201) according to claim 1.

15. A wind turbine blade according to claim 6, further comprising a layer of semiconductive material provided between the inner conductor and the bedding insulation.

16. A method for retrofitting a lightning protection system to a wind turbine blade, wherein the blade (1, 51, 101, 201) comprises a shell body made of a composite material and comprises a longitudinal direction with a root end and a tip end, the blade further comprising a profiled contour including a pressure side and a suction side, as well as a leading edge and a trailing edge with a chord having a chord length extending there between, the profiled contour, when being impacted by an incident airflow, generating a lift, the method comprising the steps of:
  providing the blade (1, 51, 101, 201) with at least a first lightning receptor (3, 53, 103, 203) arranged freely accessible in or on a surface of the shell body surface, and optionally at or in the immediate vicinity of the tip end of the blade (1, 51, 101, 201),
  providing the blade (1, 51, 101, 201) with a lightning down conductor (2, 52, 102, 202) made of electrically conductive material extending within the shell body from the lightning receptor (3, 53, 103, 203) to the root end of the blade (1, 51, 101, 201), the lightning receptor (3, 53, 103, 203) and the lightning down conductor (2, 52, 102, 202) being electrically connected, and
  providing the shell body with at least a first conductive layer (60) extending along at least a longitudinal part of the lightning down conductor (2, 52, 102, 202) in a transverse distance therefrom, wherein the first conductive layer (60) is electrically isolated from the lightning down conductor (2, 52, 102, 202) and/or the lightning receptor (3, 53, 103, 203), and wherein the sheet resistance of the conductive layer (60) is in the range of 1 to 5 Mega Ohm pr. square.

* * * * *